2,821,842
IRRIGATION CONTROL GATE

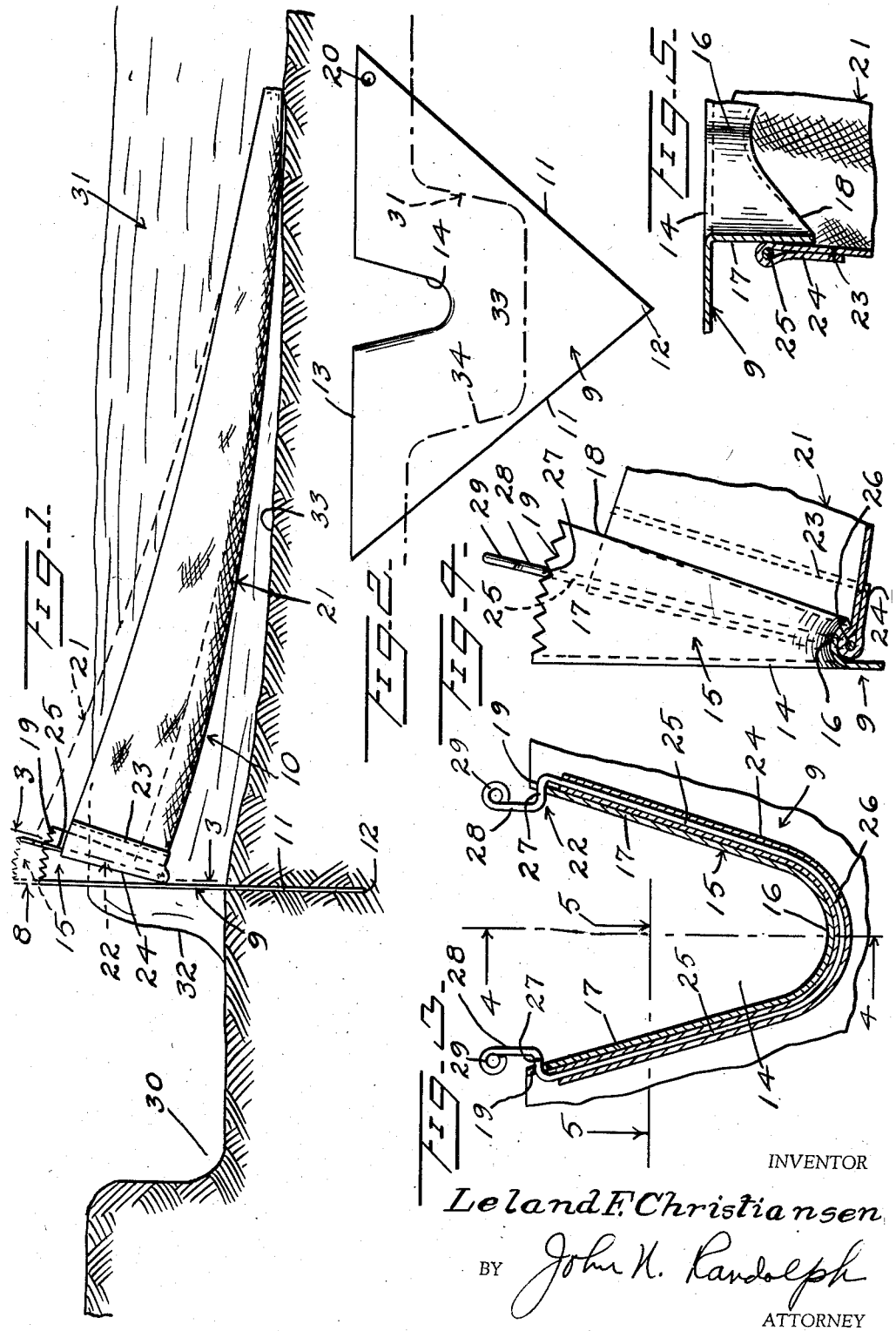
Feb. 4, 1958 — L. F. CHRISTIANSEN — 2,821,842
IRRIGATION CONTROL GATE
Filed April 25, 1955
INVENTOR
Leland F. Christiansen
BY John K. Randolph
ATTORNEY

Leland F. Christiansen, Otto, Wyo.

Application April 25, 1955, Serial No. 503,509

2 Claims. (Cl. 61—29)

This invention relates to a novel control gate or adjustable dam for regulating the flow of irrigation water through furrows, laterals, canals or other irrigation ditches or passageways and by means of which the volume of flow into or through a furrow or lateral may be accurately regulated.

More particularly, it is an object of the present invention to provide a control gate or dam of extremely simple construction which may be very economically manufactured and sold and which may be quickly and easily applied to a furrow or ditch for regulating the volume of flow of irrigation water therethrough and which may be readily adjusted with respect to the bed of the furrow or ditch for varying the volume of flow.

Another object of the invention is to provide a control gate or dam equipped with novel spillway means to prevent erosion or washing away of the bed of a furrow, lateral or ditch adjacent to and on the outlet side of the control gate or dam.

Still a further object of the invention is to provide a control gate or dam spillway having novel means for detachably and adjustably mounting the spillway on the dam or control gate for accommodating it to different slopes of a furrow or ditch bed.

Various other objects and advantages of the invention will hereinafter become more fully apparent from the following description of the drawing, illustrating a presently preferred embodiment thereof, and wherein:

Figure 1 is a side elevational view of the improved control gate and spillway;

Figure 2 is a front elevational view looking toward the inlet side of the control gate;

Figure 3 is an enlarged fragmentary vertical sectional view taken substantially along a plane as indicated by the line 3—3 of Figure 1;

Figure 4 is a fragmentary vertical sectional view taken substantially along a plane as indicated by the line 4—4 of Figure 3, and Figure 5 is a fragmentary horizontal sectional view, taken substantially along a plane as indicated by the line 5—5 of Figure 3.

The novel control gate in its entirety and comprising the invention is designated generally 8 and includes a control gate proper, designated generally 9, and a spillway, designated generally 10.

The control gate element 9 is preferably formed from a single piece of relatively light gauge sheet metal which is substantially triangular in shape and which includes downwardly converging side edges 11 which merge at a point 12, constituting the bottom of said control gate 9. The control gate element 9 includes a substantially straight top edge 13. Said element 9 is provided with a notch 14 which is preferably disposed directly above and spaced a substantial distance from the lower end or point 12 and which opens outwardly of said top edge 13 and has upwardly diverging side edges, so that the width of the notch 14 increases from its lower end toward its open upper end. The element 9 is provided with a flange, designated generally 15, which projects from one side thereof and which is disposed completely around the notch 14. The flange 15 constitutes an integral part of the control gate element 9 and includes a relatively narrow bottom portion 16 which is transversely rounded so that the upper side thereof is convex in cross section while the underside is of concave cross section. The free end of said bottom flange portion 16 is curved downwardly whereby said flange portion forms a discharge spout or lip. The complementary upwardly extending side portions 17 of the flange 15 increase in width relatively to the bottom spout portion 16 toward their upper ends, so that the outer edges 18 thereof, which are located remote from the plane of the gate element 9, are disposed in upwardly diverging relationship to the remainder of said gate element 9. Likewise, said side flange portions 17 extend upwardly in diverging relationship relative to one another, as best illustrated in Figure 3. The upper ends of the flange sides 17 define arcs of a circle having a center disposed directly beneath the spout 16 and said upper ends or edges are provided with notches 19. The gate element 9 adjacent to one end of its top edge 13 is provided with an opening 20 through which a wire or bail element, not shown, may extend for detachably suspending a plurality of the control gate elements 9 in a convenient manner to be carried for placement in or after removal from furrows, laterals, ditches or the like.

The spillway 10 comprises an elongated strip of a suitable flexible material such as fabric, designated generally 21, and a substantially V-shaped mounting clip, designated generally 22. The fabric strip 21 is preferably formed of canvas or a similar relatively flexible fabric which is substantially impervious to water. Said spillway strip 21 tapers slightly in width from end-to-end thereof and the wider end thereof is turned back and stitched as seen at 23 to provide a fold 24.

The mounting clip 22 is formed from a single strand of resilient wire and includes downwardly converging legs 25, the converging ends of which merge with a rounded bottom or intermediate portion 26 of the clip 22. The legs 25 and clip portion 26 are disposed in the fold 24. The divergent ends of the legs 25 project from the ends of the fold 24 and have inturned terminal portions 27. End portions of the wire forming the clip 22 form upwardly projecting extensions 28 of the inner ends of said inturned portions 27 and which terminate in outturned loops or eyes 29.

For the purpose of illustrating a preferred application and use of the control gate 8, a portion of a main irrigation ditch 30 is illustrated in cross section in Figure 1 and a portion of a furrow or lateral 31 is shown in longitudinal section and having an end 32 opening laterally into the main irrigation ditch 30. The pointed lower end 12 of the control gate element 9 is driven downwardly into the bed 33 of the furrow or lateral 31 adjacent its inlet end 32 to an extent so that the side edges 11 thereof will be disposed beneath the furrow bed 33 and outwardly with respect to the sides or banks 34 of said furrow 31, as indicated in broken lines in Figure 2. The control gate element 9 will be embedded in the earth to a desired depth so that the bottom of the notch or passage 14 can be located a desired distance above the furrow bed 33 and so that the upper edge 13 of said element 9 will be disposed above the level of the top of the furrow 31. The flange 15 will be disposed on the side of the control gate element 9 located remote from the main irrigation ditch 30 and which constitutes the outlet or downstream side of the control gate. The element 9 is adjusted as to depth in the furrow 31 so that the bottom portion of the notch or passage 14 thereof will be disposed below the level of the water, not shown, in the main irrigation ditch 30, so that a part of said water passing along the irrigation ditch 30 may flow through the notch or passage 14 into the furrow 31. By varying the extent that the element 9 is embedded in the earth around the furrow 31, the elevation of the bottom of the notch 14 is varied relatively to the furrow bed 33 and accordingly the level of the bottom of the notch 14 is varied relatively to the water level in the main irrigation ditch 30. In this manner, the volume of water passing through said notch or passage 14 can be varied as desired. It will be obvious that since the notch or passage 14 increases in width from its lower end toward its upper end, that a greater volume of water can pass through an upper portion of the notch 14 of a given vertical height than through a bottom portion of said notch of the same vertical height. It will also be apparent that the control gate may be employed in conection with other types of ditches than the furrow 31 and may be made in various sizes for accommodating it to ditches and furrows of different widths and depths. The control gate element 9 may be quickly and easily applied to or removed from a furrow or ditch and as previously explained, a number of such elements may be conveniently carried for selective placement in or removal from ditches or furrows. The bottom flange portion 16 provides a spout over which the irrigation water flows from the main ditch 30 into the furrow 31. It will be readily obvious that the discharge of the water, being from a considerable elevation onto the furrow bottom 33, may produce a washing out or erosion of the furrow bottom adjacent to and on the downstream side of the control gate member 9. This is particularly true where the furrow bottom 33 is below the level of the bottom of the main irrigation ditch 30 so that the notch 14 is disposed at a greater elevation than illustrated relatively to the furrow bottom.

To avoid such erosion or washing away of the furrow bottom 33 the spillway 10 is utilized. Said spillway may be quickly and easily mounted detachably on the flange 15 by engaging the intermediate fold part 24, in which the mounting clip portion 26 is disposed, beneath the bottom or spout portion 16 of the flange 15, as illustrated in Figures 1, 3, 4 and 5, and so that the end portions of the fold 24 containing the clip legs 25 will extend upwardly along the outer faces of the flange sides 17. Said legs are of sufficient length whereby when the clip is thus disposed the inwardly extending clip portions 27 will selectively engage complementary notches 19 of the two frame sides 17. The legs 25 are spring biased toward one another to maintain the clip thus mounted on the flange 15. It will be apparent that the clip portions 28, 29 are grasped between the fingers for spreading the clip legs 25 to either apply the spillway 10 to or to remove said spillway from the flange 15. Said portions 28 and 29 are similarly engaged for selectively positioning the portions 27 in different complementary notches 19. By thus angularly adjusting the clip 22 relatively to the flange 15, the angle of the spillway relatively to the plane of the member 9 can be varied for accommodating the spillway strip 21 to furrow or ditch bottoms 33 which slope away from the member 9 at different angles. The spillway strip 21 is bowed transversely by the mounting clip 22 to provide a channel into which the irrigation water from the notch or passage 14 is discharged and said strip 21 extends longitudinally of the furrow or ditch 31 a substantial distance from the member 9 to carry the water a substantial distance before it is discharged into the furrow or ditch and to convey the water downwardly at an incline to substantially the level of the ditch bottom 33 before the water is discharged from the spillway into the ditch. Thus, washing away or erosion of the ditch bottom 33 will be eliminated.

Various modifications and changes are contemplated and may obviously be resorted to, without departing from the spirit or scope of the invention as hereinafter defined by the appended claims.

I claim as my invention:

1. An irrigation ditch control gate of the character described comprising a substantially rigid plate of triangular shape having a notch formed therein and opening outwardly of one edge of said plate and disposed substantially in alignment with one corner of the plate, said edge forming the top of the plate and said corner forming the pointed bottom thereof, said notch constituting a passage for irrigation water and having a rounded inner end and side edges diverging relative to one another from said inner end toward said upper edge of the plate, said plate including an upstream side and a downstream side, a flange forming an integral part of said plate and projecting outwardly from the downstream side thereof and disposed around said notch or passage, said flange including a longitudinally rounded bottom portion conforming to the inner end or bottom of said notch or passage and upwardly extending side portions disposed in diverging relationship to one another and conforming to the sides of said notch or passage, said bottom portion of the notch having an upper side concavely arced longitudinally and convexly arced transversely from side to side thereof to provide a discharge lip or spout for said passage, a spillway comprising an elongated fabric strip, and a mounting clip connected to one end of said fabric strip and engaging around and detachably mounted on said flange for supporting said fabric strip end around the bottom and side portions of the flange, said fabric strip extending from the flange in a direction away from said plate, said strip being formed of a flexible material substantially impervious to water and provided with a fold in which a portion of the mounting clip is disposed, said mounting clip including leg portions spring biased toward one another and toward said flange sides, said mounting clip including portions forming inturned extensions of upper ends of said legs, said inturned extensions engaging over upper edges of said flange sides, said mounting clip including an intermediate portion disposed beneath said bottom flange portion, said bottom flange portion having an underside concavely bowed in cross section in which said intermediate clip portion is confined when said inturned extensions of the clip are in engagement with the upper edges of the flange sides, and said upper edges of the flange sides being provided with a plurality of notches selectively receiving said inturned extensions of the clip for supporting the clip and the folded end of the fabric at different angles relative to said plate.

2. A control gate as in claim 1, said notched edges defining arcs having a common center disposed beneath and adjacent said bottom portion of the flange.

References Cited in the file of this patent

UNITED STATES PATENTS

| 321,593 | Fry | July 7, 1885 |
| 865,623 | Wood | Sept. 10, 1907 |
| 874,378 | Allen | Dec. 24, 1907 |
| 1,113,080 | Wilson | Oct. 6, 1914 |
| 1,404,325 | Schaefer | Jan. 24, 1922 |
| 1,527,383 | Solliday | Feb. 24, 1925 |
| 1,772,518 | Pardini | Aug. 12, 1930 |
| 1,821,690 | Calkins | Sept. 1, 1931 |
| 2,101,526 | Bryant | Dec. 7, 1937 |
| 2,654,225 | Saunders et al. | Oct. 6, 1953 |
| 2,725,720 | Lough | Dec. 6, 1955 |